Inventors: R. E. Hantzsch
O. C. Mudd

By their Attorney:

Inventors: R.E. Hantzsch
O.C. Mudd
By their Attorney:

Patented June 18, 1946

2,402,494

UNITED STATES PATENT OFFICE 2,402,494

CATHODIC PROTECTION SYSTEM

Ralph E. Hantzsch and Ora C. Mudd, Houston, Tex., assignors to Shell Development Company, San Francisco, Calif., a corporation of Delaware Application June 18, 1943, Serial No. 491,422

4 Claims. (Cl. 171—316)

This invention pertains to methods of cathodic protection of pipe lines, and relates more particularly to a system comprising a pipe line, a variable speed generator, such as a wind or water driven generator, and an automatic control switch adapted to change the electrical connections in said system in response to generator output variations in such a manner as to establish selectively any of the following sets of operating conditions: first, to supply to the pipe line a protective current from said battery when the generator is idle or running at low speed, second, to supply a protective current to the pipe line and a charging current to the battery when the voltage of the generator is in excess of that of the battery and the intensity of the current delivered by the generator to the pipe line is in excess of a predetermined minimum value, and, third, to disconnect the battery entirely and to supply only a protective current to the pipe line from the generator when the intensity of this current falls below a predetermined minimum value.

In the operation of pipe lines for the transportation of petroleum or other products, considerable damage and even ultimate deterioration and loss of the pipe may result from corrosion caused by electrolytic potentials developed in the pipe and electric currents flowing therein.

Especially dangerous corrosive conditions exist at points where the pipe is at a higher positive potential than the ground with which it is in contact, and where electric currents flow therefore from the pipe to the ground.

It is therefore customary, in addition to providing pipe lines with suitable insulation, to counteract these corrosive effects by cathodic protection means, that is, by applying to the pipe line from an outside source an electric current sufficient to keep the pipe line at a zero or negative potential with regard to the surrounding ground.

From a theoretical point of view, an infinite number of neutralizing negative potentials applied to the pipe line would be required for complete protection. Practically, however, satisfactory and substantially complete cathodic protection is achieved by supplying electric currents to the pipe line at relatively large intervals, while properly selecting the values of said currents and the spacing between their points of entry.

When a pipe line is protected by a negative potential applied thereto from an external source, return circuit means must be provided for this source to complete the circuit. This usually takes the form of a buried electrode having a large surface area and consisting, for example, of cast iron, which, being rich in carbon, is less susceptible to electrolytic deterioration than other metals.

Any desired type of external potential source may be used for cathodic protection purposes, such, for example, as a motor driven generator, a storage battery, etc. Such sources, however, require constant attendance, servicing or recharging which are not available in remote and difficultly accessible places sometimes traversed by pipe lines.

Wind or water-flow driven generators offer therefore a more convenient source of potential, since they may be permanently connected to a pipe line and require little attention. Such sources of potential or current for systems of cathodic protection are, however, relatively uncertain, and may at times even be detrimental, as they can be set only for some assumed average velocity of water or wind flow. Wind velocities are often known to fluctuate rapidly between zero and very high values. When the velocity of the wind is excessive, the value of the negative potential applied to the pipe, especially near the generator connected thereto, becomes so high that a strong current may flow from the ground to the pipe line, removing by excessive hydrogen generation some of the corrosive coating previously formed on pipe, which coating serves to some extent as a protection, thus baring the pipe and permitting further corrosion of previously sound pipe material. In general, such systems have therefore the disadvantages of actually creating an undesirable condition and of being wasteful of electrical energy at times of high wind velocities, while leaving the pipe line completely without protection at times of low or zero wind velocities.

It is therefore an object of this invention to provide a cathodic protection system for pipe lines involving the combination of a wind driven generator and of a storage battery with suitable control equipment, whereby the excess of electrical energy generated at times of high wind velocities is automatically applied to charge the storage battery which in turn protects the pipe line at times when the wind velocity is too low for this purpose.

It is also an object of this invention to provide a cathodic protection system wherein any sequence of operations may be interrupted at any point, and may again be resumed, immediately or after any delay, in a direction coordinated with any possible change in the direction or velocity of the medium from which this system derives its power, such as wind.

Since in this system the generator must develop a voltage higher than that of the battery in order to overcome its counter-E. M. F. and re-charge said battery, it is an object of this invention to provide an automatic control switch adapted to be actuated into an operative position solely in response to a predetermined change of the generator's voltage.

Since, on the other hand, an effective cathodic protection is a function of the intensity of the current delivered to the pipe line rather than of the potential applied thereto, it is also an object of this invention to provide an automatic control switch adapted to be actuated into an inoperative position solely in response to predetermined changes of the intensity of the current delivered by the generator to the pipe line.

It is a further object of this invention to provide an automatic control switch having a plurality of electromagnetic voltage and current coils wherein the energization of the current coils is solely a function of the energization of the potential coils, whereas the de-energization of the current coils is solely a function of predetermined adjustable changes of the intensity of the current delivered to the pipe line.

It is also an object of this invention to provide an automatic control switch wherein electromagnetic voltage and current coils have combined or cooperating therewith a plurality of polarizing or rectifying devices adapted to prevent any change in an established set of switch conditions from occurring in response to a reversal in the direction of the currents flowing in various branches of the circuit, and also to prevent energized current coils from losing their control to the voltage coils.

It is also an object of this invention to provide an automatic control switch having an electromagnetic circuit arranged so that a large-angle rotational motion of an armature is permitted with regard to the pole piece of an electromagnet upon the energization of said magnet, the length of the air gap between said armature and pole piece being continuously decreased throughout said motion.

These and other objects of this invention will be understood from the following description taken with reference to the attached drawings, wherein.

Figure 1:
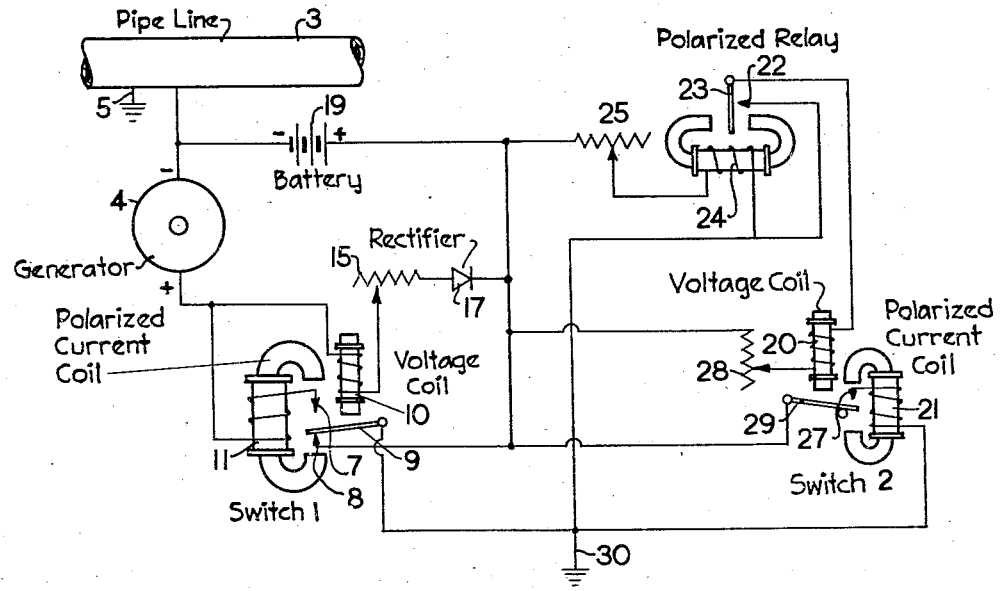
Fig. 1 is a diagram showing the general arrangement of the elements of the present system.

Referring to Fig. 1, the present system comprises a wind-driven generator 4, having its negative terminal connected to a pipe line 3 imbedded in the ground, as shown by the ground symbol at 5. A battery 19, such as a storage battery, having any desired number of cells connected in series or in parallel, has its negative terminal connected to the negative terminal of the generator and to the pipe line 3.

The present automatic control system comprises two main switches 1 and 2. Switch 1 comprises a contact-making element 9, selectively adapted to close with contact 7 or with contact 8. Element 9 is closed with contact 7 by solenoid means comprising a voltage coil 10, and is maintained in said position by solenoid means comprising a polarized current coil 11. Element 9 is closed with contact 8 by means such as spring action or simply by gravity.

The voltage coil 10 and the polarized current coil 11 each have one end connected to the positive terminal of the generator. The other terminal of the voltage coil 10 is connected through an adjustable resistance 15 and a rectifier 17 such as a copper oxide rectifier, to the positive terminal of the battery 19.

Switch 2 comprises a contact making element 29, adapted to close with a contact 27 by solenoid means comprising a voltage coil 20, and to remain closed therewith by solenoid means comprising a polarized current coil 21. The switch 29 remains open by spring action or by gravity, when the voltage and current coils are not energized.

The terminals of the polarized current coil 21 are connected respectively to the contact 27 and to the ground electrode 30. The terminals of the voltage coil 20 are connected respectively to the positive terminal of the battery 19 through an adjustable regulating resistance 28, and to a contact making element 23 of a polarized relay having a contact 22 and a coil 24. The contact 22 and one of the terminals of the coil 24 are connected to the ground electrode 30, and the other terminal of the coil 24 is connected to the positive terminal of the battery 19 through an adjustable regulating resistance 25.

Although, in order to simplify the circuit diagram, the present automatic control switch has been shown in Fig. 1 as comprising movable contact making elements 9 and 29, it is understood that a somewhat modified embodiment is used in practice, in view of the extremely high number of reliable operations of the switch elements required under normal operating conditions, and the absolute freedom from contact sticking or wearing-out which are the essential requirements for a successful operation.

Figure 2:
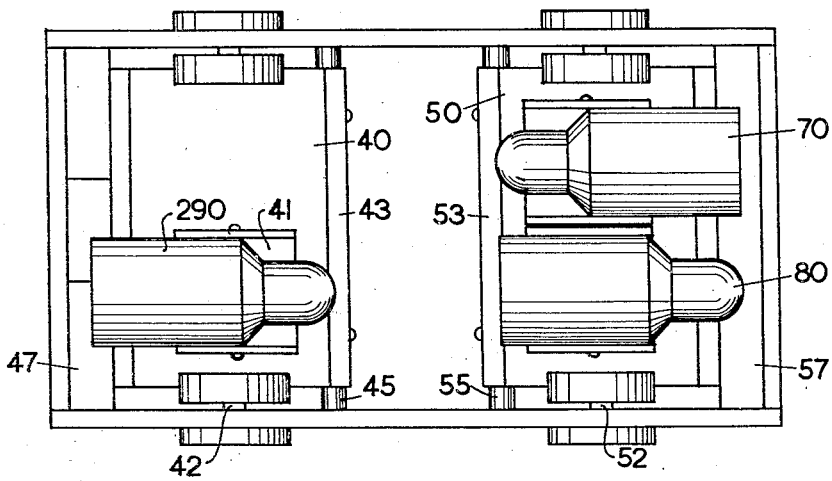
Fig. 2 is a plan view of an embodiment of the automatic switch of the present invention with the mercury switches in a horizontal position.
Figure 3:
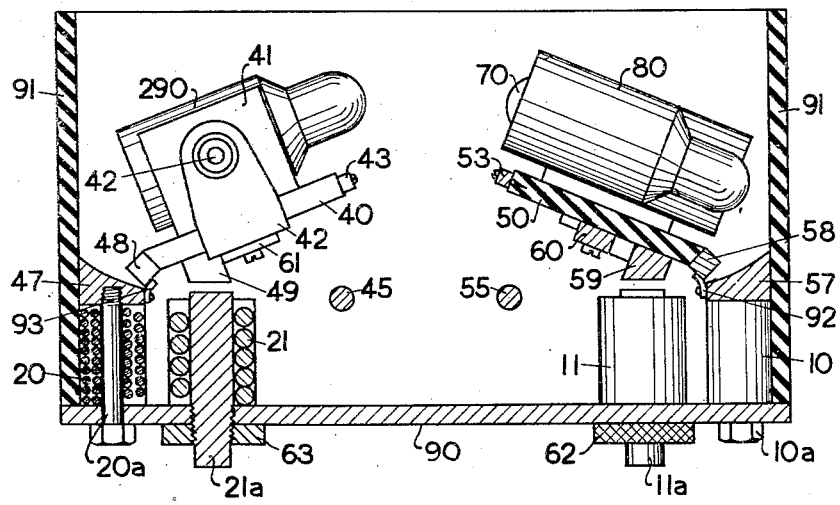
Fig. 3 is an elevation view of the device of Fig. 2 with the mercury switches in an operative position.

This practical embodiment of the present device is shown in Figs. 2 and 3, wherein the functions of the movable element 9 and contacts 7 and 8 are carried out by mercury switches 70 and 80, whereas the functions of the element 29 and contact 27 are carried out by means of mercury switch 290. These switches are of a completely sealed type capable of carrying a normal current of about 65 amperes, such, for example, as those commercially known as Durakool Switches No. A65S. Switch 290 is mounted on a tilting table 40 by means of an adjustable cradle structure 41, while switches 70 and 80 are mounted in the same manner on a common tilting table 50.

The tilting tables are made, or partly made, of insulating material, and are suspended on free running ball bearings 42 and 52. Accurately adjustable counterweights 43 and 53, are provided to carry the tilting tables into the inactuated positions against the stop rods 45 and 55.

The mercury switch elements are operated by tilting the tables 40 and 50 through an angle of approximately 15 degrees. Tilting a switch element with the larger end below horizontal closes the switch circuit, while tilting the switch elements with the smaller ends below the horizontal opens the switch circuit. It will therefore be seen that since switches 70 and 80 are mounted on the same tilting table in opposite longitudinal directions, one of them will always be open when the other is closed. The electrical connections to the switches 70 and 80 are arranged so that the closing of the switch 70 corresponds in effect to the closing of elements 7 and 9 of Fig. 1, while the closing of switch 80 corresponds to the closing of elements 8 and 9 of Fig. 1. Fig. 3 shows therefore the automatic control switch in an energized position with the switch 70 closed, that is, in a position opposite to that of Fig. 1. The same is true of switch 290, which is shown in a position corresponding to that of Fig. 1 where element 29 would be in contact with element 27.

The solenoid means of Fig. 1 are shown in Fig. 3 as consisting of voltage coils 10 and 20, and current coils 11 and 21 wound around magnetic cores 10a, 20a, 11a and 21a respectively. There are two coils or spools of each type, only one of which is seen in Fig. 3.

As an example, the voltage coil 20 may consist of approximately 180 turns per spool of a No. 14 E. C. C. wire wound to an even number of turns on two spools which are connected in series.

The current coil 21 may consist of three layers of No. 10 E. C. C. wire on each of two spools connected in parallel.

The current coil 11 may consist of two layers of No. 8 square D. C. C. wire on each of two spools connected in parallel.

The voltage coil 10 comprises two spools connected in series, each spool having about 2,350 turns of No. 25 E. C. C. wire.

The solenoid elements 10, 11, 20 and 21 exercise, upon energization, a pulling force on the tilting tables 40 and 50 through their magnetic cores, the tilting tables being in turn provided with corresponding magnetic armatures 58, 59, 49 and 48. The polarization of the magnetic circuits of the current coils of the current coils 11 and 21 is effected by means of permanent magnets 60 and 61 attached to the bottoms of tables 50 and 40 in contact with the armatures 59 and 49. The cores of the current coils 11 and 21 are furthermore adjustable in a vertical direction by means such as the adjusting screws shown at 62 and 63, whereby the length of the air gap between the cores of said coils and their respective armatures may be adjusted in a desired way.

The voltage coils 10 and 20, which, as will be seen from the following description, are the actuating elements of the present control switch, are provided with pole pieces 57 and 47, made with substantially arcuate faces such that, as the tilting tables move from an inoperative position of rest against the rods 55 and 45 to the operative position shown in Fig. 3, the effective length of the air gaps between said pole pieces and their respective armatures 58 and 48 is continuously decreased, thus fulfilling a fundamental principle of electromagnetic design while permitting a relatively large angular displacement of the tilting tables. Non-magnetic stop members 92 and 93 are provided on the pole pieces 57 and 47 respectively to limit the motion of the tilting tables towards their operative position.

The base 90 of the switch mounting, the coil cores and their armatures are preferably made of good quality soft magnetic material, although cold rolled steel is satisfactory.

The side walls 91 of the switch holder are preferably made of insulating material, and are provided with necessary terminal means, not shown, to supply the electric current to the various elements of the automatic control switch in accordance with the diagram of Fig. 1.

The resistances 15, 25 and 28, the rectifier 17 and the polarized relay switch 22—23—24 of Fig. 1 are also placed in the switch holder, but are not shown in Figs. 2 and 3 to simplify said figures.

Figure 4:
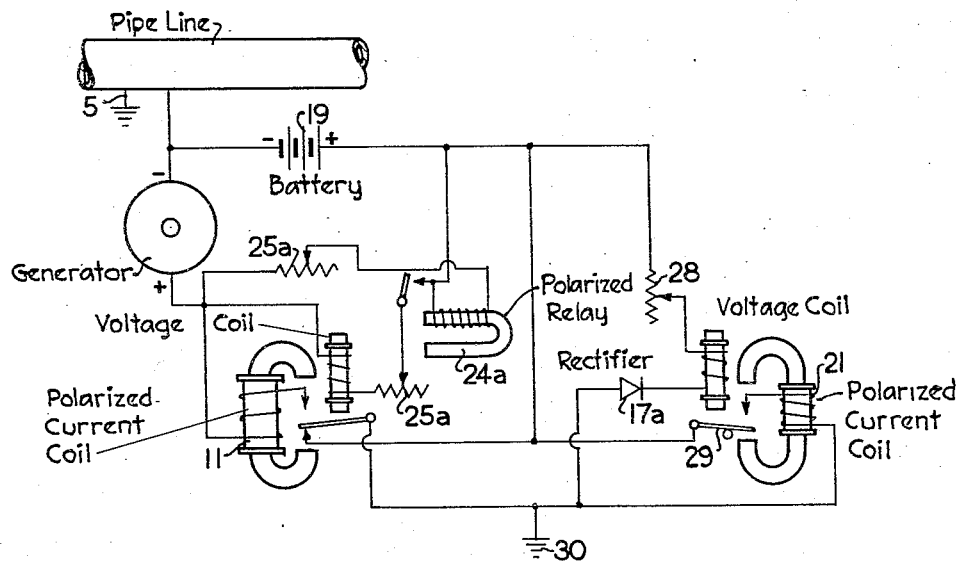
Fig. 4 shows a circuit similar to that of Fig. 1.

Referring again to Fig. 1, it should be understood that the voltage coils 10 and 20 are the energizing elements of the present system, and the current coils 11 and 21 are the holding or operating elements thereof. The rectifier 17 and polarized relay 22—23—24 are merely control means which may both be termed as biasing means and which are used to polarize the voltage coils 10 and 20 respectively in such a manner as to prevent their operation, holding, or assuming release control from the current coils upon a reverse current. Their functions are therefore identical, and they may be used interchangeably, that is, a rectifier may be used instead of a polarized relay to control the voltage coil 20, or a polarized relay may be used instead of a rectifier to control the voltage coil 10. As will be obvious from the following description of the operation of the present device, the particular selection of either of these biasing means of control is determined only by consideration of design and ease of regulation. Fig. 4 shows a circuit equivalent to that of Fig. 1, but having a polarized relay 24a substituted for the rectifier 17, while a rectifier 17a is substituted for the polarized relay 24 of Fig. 1.

In operation, with the wind-driven generator 4 stationary and not developing any voltage, the various elements of the pipe line cathodic protection switch described above will be in the positions shown in Fig. 1. Under these conditions, the battery 19, which develops on the average a voltage such as from 3 to 12 or more volts, is connected through contacts 8 and 9 between the pipe line 3, to which its negative terminal is applied, and the ground 30, which is the protective ground electrode described above, to which its positive terminal is applied.

If now the generator 4 is driven by the wind, and the voltage generated thereby reaches some value, for example, such as from 3 to 24 volts or higher, which is above that of the battery voltage, the voltage coil 10 of switch 1 becomes energized and causes the switch to operate, whereby the connection between contacts 8 and 9 is broken, and that between contacts 7 and 9 is made. This operation disconnects the battery 19 from the pipe line-ground circuit, substituting the generator in its place, so that the current now flows from the positive terminal of the generator, through the current coil 11, contacts 7 and 9, electrode 30, the ground, pipe line 3, and back to the negative terminal of the generator. The current coil 11, upon being energized, acts as a holding coil for the switch 1 to maintain contacts 7 and 9 closed.

The adjustable resistance 15 is provided to regulate the voltage value at which the switch 1 will operate. A rectifier element 17, such as a copper oxide rectifier, is additionally provided in series with the voltage coil 10, so that when the generator slows down and its voltage becomes less than that of the battery, no reverse current can flow through the voltage coil 10 to force the switch back to the position shown in the drawings. The complete control of the release of switch 1 is in the current or holding coil 11, which is provided with the described polarizing permanent magnet arrangement, which assures the release of the switch 1 solely when the current through the current coil reaches a predetermined low value upon a slowing down of the generator, as will be shown hereinbelow.

It is possible to cause the switch 1 to release over a considerable range of current by means, for example, such as the adjustment of the variable air gap in the magnetic circuit of the current coil, as described in connection with Fig. 3. The preferred release current for the switch 1 is from about 2 to 8 amperes of generator current.

Following further the cycle of operation of the present system, assuming that the generator is running and that switch 1 has been operated, it will be seen that this operation, by opening contacts 8 and 9, causes the circuit of the battery 19 to the ground to be completed through the polarized relay 24, which relay had previously been short-circuited by the contacts 8 and 9.

Now, with the generator connected between the pipe line and the ground, and the battery, having the same polarity as the generator, also connected between the pipe line and the ground in series with the polarized relay coil 24, this relay is subject to the voltage difference between the generator and the battery. The relay should preferably be very sensitive and adjusted to operate at a point well below the operating point of the switch 2. The relay 24 is polarized so that when the voltage of the generator 1 is in excess of that of the battery 19, this relay will close contacts 22 and 23. The resistance 25 is provided as means for adjusting the voltage sensitivity of the relay 24. In this manner, as soon as switch 1 has operated, the polarized relay 24 will operate to close the contacts 22 and 23, thereby starting the cycle of operations of the switch 2 by connecting the voltage coil 20 of said switch in parallel with the winding of the relay 24 between the battery 19 and the ground.

As the voltage of the generator 4 rises and reaches some predetermined value above the voltage of the battery, preferably 1 volt or less, the voltage coil 20 is energized and the switch 2 operates to close the contacts 27 and 29, whereby the battery is connected across the generator in series with the relatively low resistance current coil 21, which acts as a holding coil to keep the switch closed. A variable resistor 28 is provided as a ready voltage sensitivity adjustment means for the switch 2. With the switch 2 closed, the generator 4 not only supplies to the pipe line a protective current, but also stores electrical energy in the storage battery 19 by re-charging said battery, which condition obtains for all speeds of the generator from the operating point of the switch 2 to the maximum speed which the generator may attain.

It may be noted in this connection that this recharging action is possible because of the fact that although Fig. 1 shows reference numerals 5 and 30 both as ground connections, they are two different ground connections, and consequently form the terminals of an electrical resistance circuit consisting of a portion of the pipe 3, the pipe line to ground resistance, the resistance of the ground between the pipe line and the ground electrode 30, and the contact resistance of electrode 30, all in series. Although in general the total resistance of the ground path from terminal 5 to terminal 30 is of relatively small value, it still has a finite value, such as a minimum value of about 0.1 ohm. When, therefore, a current flows between points 5 and 30, a potential difference exists between these points. For example, if the ground current has a value of 30 amperes, and the ground circuit a resistance of 0.2 ohm, a potential difference of 6 volts becomes available between points 5 and 30 for charging the battery, and any further increase of intensity of the ground current from point 5 to point 30 results in a corresponding increase in potential difference between these points.

A complete cycle of operation of the present device has been described with regard to an increasing wind velocity and generator output. When the wind velocity and the generator output voltage decreases, the current supplied to the two circuits comprising the battery 19 and the pipe line 3 respectively, will also decrease. The current in the circuit comprising the battery 19 will reach a low value first in view of counter-E. M. F. provided by the battery. The switch 2, which is set to release at or near zero current, will open first, leaving the generator to supply current to the pipe line only. A further decrease in generator voltage will cause a further reduction in the intensity of the current supplied to the pipe line, until a value such as 2 to 8 amperes is reached, at which value the polarized current coil 11 is set to release, whereby the generator is disconnected from the pipe line and the battery is connected thereto through contacts 8 and 9 to supply a protective current during times of low wind velocities and generator speeds.

It is obvious that the complete cycle of operations does not necessarily or even normally take place in the order and sequence described above, but that it may be interrupted at any point and then resumed in any direction after a pause of any duration, the present system being essentially well adapted to follow unpredictable shifts of wind while obtaining the maximum useful energy available therefrom for the protection of the pipe line.

We claim as our invention:

1. In a cathodic protection system comprising a pipe line and a grounded electrode, a circuit comprising two parallel branches between a point on the pipe line and said electrode, a variable speed generator in the first branch, a battery in the second branch, an electromagnetic switch selectively adapted to close the generator branch in response to an excess of the generator voltage over the battery voltage, and to close the battery branch in response to a decrease of the generator current to a predetermined value, and a second electromagnetic switch selectively adapted to close the battery branch in response to the closure of the generator branch by the first switch, and to open the battery branch in response to a decrease of the generator current to a predetermined value.

2. In a cathodic protection system comprising a pipe line and a grounded electrode, a circuit comprising two parallel branches between a point on the pipe line and said electrode, a variable speed generator in the first branch, a battery in the second branch, a switch selectively adapted to close one of said branches, means comprising a voltage coil connected between said branches adapted to actuate said switch to close the generator branch in response to an excess of the generator voltage over the battery voltage, means comprising a current coil in the generator branch adapted to cause said switch to open said branch in response to a decrease of the generator current to a predetermined value, a second switch, means comprising a second voltage coil energized by the closing of the generator branch adapted to actuate said second switch to close the battery branch, and means comprising a second current coil connected in parallel circuit with said current coil adapted to cause said switch to open said branch in response to a decrease of the generator current to a predetermined value.

3. In a cathodic protection system comprising a pipe line and a grounded electrode, a circuit comprising two parallel branches between a point on the pipe line and said electrode, a variable speed generator in the first branch, a battery in the second branch, a switch selectively adapted to close one of said branches while opening the other branch, biased means comprising a voltage coil connected between said branches for actuating said switch to close the generator branch in response to an excess of the generator voltage over the battery voltage, biased means comprising a current coil in the generator branch adapted to cause said switch to maintain said branch closed in response to a predetermined intensity of the generator current and to open said branch in response to a decrease of the intensity of said current below said predetermined value, a second switch, biased means comprising a second voltage coil energized by the closing of the generator branch adapted to actuate said second switch to close the battery branch, and biased means comprising a second current coil adapted to cause said switch to maintain said branch closed in response to a predetermined intensity of the generator current and to open said branch in response to a decrease of the intensity of said current below said predetermined value.

4. In a cathodic protection system comprising a pipe line and a grounded electrode, a circuit comprising two parallel branches between a point on the pipe line and said electrode, a variable speed generator in the first branch, a battery in the second branch, mercury switch means selectively adapted to close one of said branches while opening the other branch, a pivoted support for said mercury switch means, magnetic armature means attached to said support, electromagnetic means comprising a voltage coil electrically connected between said branches for actuating said switch to close the generator branch by establishing an electromagnetic linkage between said coil and said armature means in response to an excess of the generator voltage over the battery voltage, whereby said support is pivotally moved in one direction, polarized electromagnetic means comprising a current coil electrically connected with generator branch for causing said switch to open said branch by modifying the electromagnetic linkage between said coil and said armature means in response to a decrease of the generator current to a predetermined value, whereby said support is pivotally moved in the other direction, second mercury switch means, a pivoted support for said mercury switch means, magnetic armature means attached to said support, electromagnetic means comprising a voltage coil energized by the closing of the generator branch for causing said switch to close the battery branch by modifying the electromagnetic linkage between said coil and said armature whereby said support is pivotally moved in one direction, polarized electromagnetic means comprising a current coil electrically connected in a parallel circuit with said first current coil for causing said switch to open said branch in response to a decrease of the generator current to a predetermined value, whereby said support is pivotally moved in the other direction.

RALPH E. HANTZSCH.
ORA C. MUDD.